(12) United States Patent
Kokubo et al.

(10) Patent No.: US 6,385,154 B1
(45) Date of Patent: May 7, 2002

(54) DISK DRIVE CONFIGURED TO EXPAND TO DISK-STORING SIZE FROM COMPACT SIZE THAT IS SMALLER THAN DIAMETER OF DISK

(75) Inventors: Wataru Kokubo, Tokyo; Akira Kadonaga, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/470,858

(22) Filed: Dec. 23, 1999

(30) Foreign Application Priority Data

Dec. 24, 1998 (JP) .......................................... P10-367485
Jun. 21, 1999 (JP) .......................................... P11-173893

(51) Int. Cl.[7] .............................................. G11B 33/12
(52) U.S. Cl. ..................................... 369/75.1; 369/75.2
(58) Field of Search ............................... 369/75.1, 75.2, 369/77.1

(56) References Cited

U.S. PATENT DOCUMENTS

| | | | |
|---|---|---|---|
| 5,265,083 A | * 11/1993 | Ishii et al. .................. | 369/75.2 |
| 5,355,357 A | * 10/1994 | Yamamori et al. .......... | 369/75.2 |
| 5,504,730 A | * 4/1996 | Kanada ...................... | 369/75.1 |
| 5,517,478 A | * 5/1996 | Park .......................... | 369/77.2 |
| 5,610,891 A | * 3/1997 | Choi ........................ | 369/77.2 |
| 5,870,367 A | * 2/1999 | Yamamori .................. | 369/75.1 |
| 5,883,870 A | * 3/1999 | Akiba et al. ................ | 369/77.1 |
| 5,963,528 A | * 10/1999 | Fujimura et al. .......... | 369/77.1 |
| 6,137,759 A | * 10/2000 | Ogiro et al. ................ | 369/75.1 |
| 6,169,720 B1 | * 1/2001 | Kamemura et al. ........ | 369/75.2 |

FOREIGN PATENT DOCUMENTS

JP          9-135275       * 6/1997

* cited by examiner

*Primary Examiner*—William Klimowicz
(74) *Attorney, Agent, or Firm*—Oblon, Spivak, McClelland, Maier & Neustadt, P.C.

(57) ABSTRACT

An optical disk can be stored safely within a case during its use and the case can be folded to a smaller size of a depth size less than a diameter of the optical disk during its non-use. The bottom cover and the bottom slider are connected to each other in such a way that they may be extended or retracted, the top cover and the top slider attached to the bottom cover and the upper part of the bottom slider in such a way that they may be opened or closed are also connected in such a way that they may be extended or retracted, thereby there is provided a case in which the top cover may also be extended or retracted in respect to the top slider, the case is extended to form the disk storing space within the case.

16 Claims, 11 Drawing Sheets

140 ## DISK DRIVE CONFIGURED TO EXPAND TO DISK-STORING SIZE FROM COMPACT SIZE THAT IS SMALLER THAN DIAMETER OF DISK

BACKGROUND OF THE INVENTION

1. Field of the Invention

This invention belongs to a technical field of a disc drive in which a disk-like recording medium such as an optical disk like a CD-ROM or DVD-ROM and the like is loaded to enable a recording and/or a reproduction of data to be carried out.

2. Description of the Related Art

In the prior art disc drive in which an optical disk such as a CD-ROM or DVD and the like is loaded in a case while the disk is not covered and data is recorded and/or reproduced, it is a general matter to apply a structure in which a spindle motor having an optical disk installed therein and an optical pick-up for recording and/or reproducing data in or from the optical disk are stored in a case and after the optical disk is loaded on a disk table of the spindle motor, the upper part of the case is closed with a dust-proof top cover.

In addition, some of the prior art devices are operated such that the recording and/or reproduction of data is carried out while either a part of or entire optical disk is exposed out of the case.

However, this type of prior art disc drive showed a remarkable thin size of an entire case by promoting a thin size of a spindle motor or an optical pick-up and in turn in the case of the former system, it was needed to assure a storing space for the optical disk in the case, so that a width or a depth size of the case could not be reduced to a value less than a diameter of the optical disk and the device was inconvenient in its portable state.

In addition, since the latter case was constructed such that the case could be reduced to a size less than a diameter of the optical disk, although the data was recorded and/or reproduced while the optical disk was being exposed out of the case, so that its dust-proof was quite poor, either foreign materials or a user's hand or fingers were contacted with the optical disk rotated at a high speed to cause the optical disk to be damaged or the user was easily injured and so it was lack of safety.

SUMMARY OF THE INVENTION

The present invention has been completed in order to resolve the aforesaid problems and it is an object of the present invention to provide a disc drive in which during its use state a disk-like recording medium can be stored safely in a case and during its non-use state the case can be folded into a small size.

The disc drive of the present invention for accomplishing the aforesaid object comprises a bottom member of the case in which the spindle motor having the disk-like recording medium mounted thereon and means for recording and/or reproducing the disk-like recording medium mounted thereon and a top member of the case for opening or closing the upper part of the bottom member, wherein at least one of these bottom member and top member is constructed in such a way that it may be extended or retracted to cause the disk storing space for storing the disk-like recording medium to be formed within the case.

The disc drive of the present invention constructed as described above is made such that at least one of a bottom member of the case in which the spindle motor having the disk-like recording medium mounted thereon and means for recording and/or reproducing the disk-like recording medium mounted thereon and a top member of the case for opening or closing the upper part of the bottom member is formed to be extendable or retractable to constitute the extendable or retractable case, thereby the disk storing space is formed within the case under extension or retraction of the case.

DESCRIPTION OF THE PREFERRED EMBODIMENT

Referring now to the drawings, one preferred embodiment of the disc drive to which the present invention is applied will be described as follows.

Figure 1:
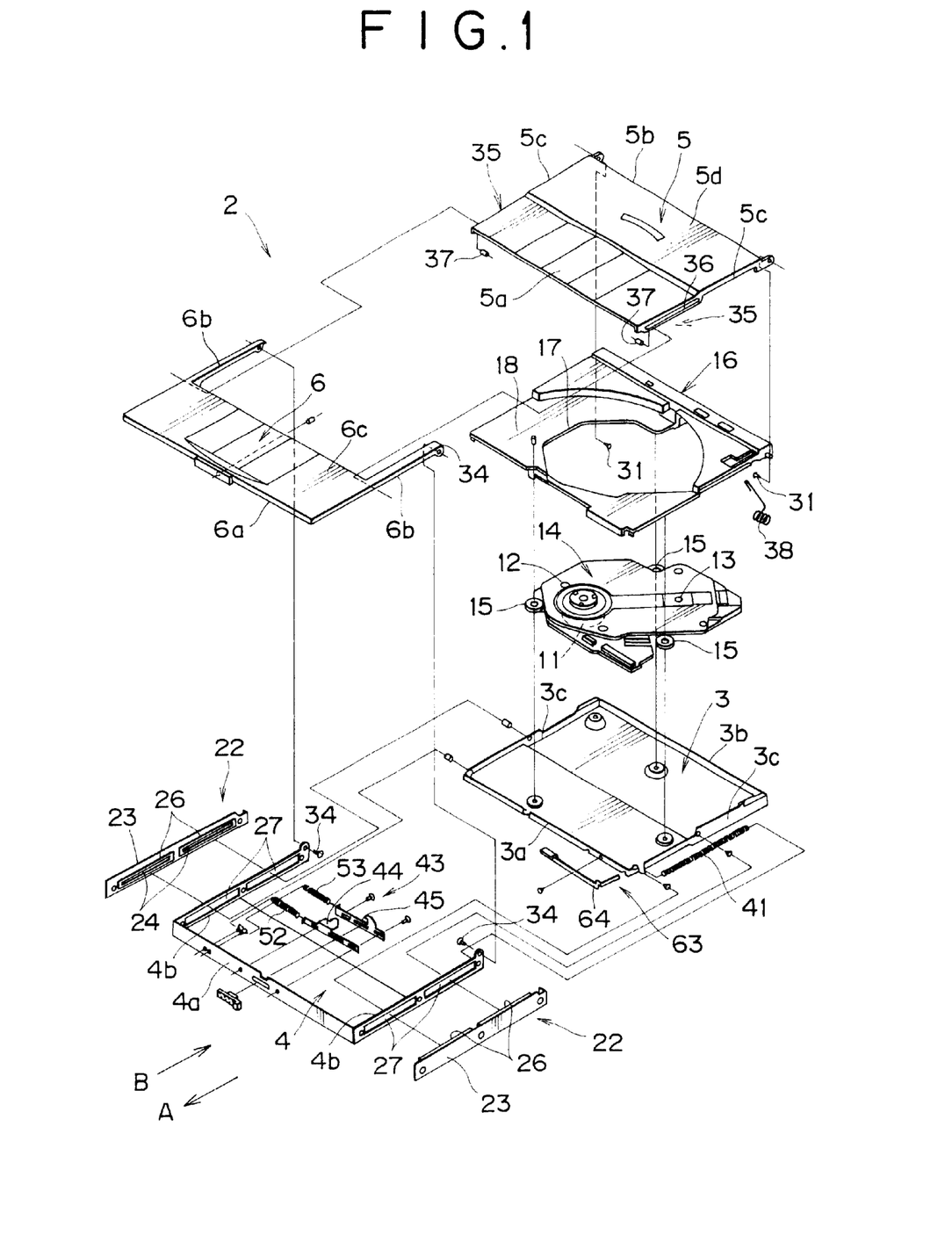
FIG. 1 is an exploded perspective view for showing composing elements of an entire case for illustrating a preferred embodiment of a disc drive to which the present invention is applied.

At first, the disc drive shown in the preferred embodiment constitutes an explosive reproducing machine for use in reproducing an optical disk 1 with a diameter of 12 cm such as a CD-ROM or a DVD-ROM and the like as one example of the disk-like recording medium. Then, a case 2 of the disc drive is constituted into a substantial flat rectangular shape by four members of a bottom cover 3 and a bottom cover 3 acting as bottom constituting members of the case 2 made of metal such as a stainless steel, a top cover 5 and a top slider 6 acting as top constituting members of the case 2, respectively. Then, this case 2 is constituted to be extendable or retractable (extending and retracting) in the directions A, B of a forward or rearward direction (a depth direction).

Then, a spindle motor 11 on which an optical disk 1 is installed, a disk table 12 integrally formed on the upper surface of the rotor of the spindle motor 11 and a driving unit 14 having an optical pick-up 13 acting as a reproducing means for reproducing data in the optical disk 1 installed thereon are fixed to the upper part of the bottom cover 3 by a plurality of screws through a plurality of insulators 15 made of rubber and the like. Then, a unit cover 16 made of synthetic resin and the like is fixed to the upper part of the bottom cover 3 by a plurality of screws, and the upper part of the driving unit 14 is covered by the unit cover 16. Then, the disk table 12 and the optical pick-up 13 are arranged to be faced up within an opening 17 formed at the unit cover 16. Then, a substantial semi-circular shaped indentation 18 where a substantial half region at the rear end of the optical disk 1 is formed at the upper part of the unit cover 16. Then, the spindle motor 11 is arranged near a position of the front end 3a of the bottom cover 3 and at a substantial central position in a lateral direction, wherein the optical pick-up 13 is arranged at the rear end 3b of the bottom cover 3 from the spindle motor 11, the optical pick-up 13 is constituted to be sought in a slant direction along a reference line inclined in respect to a central line in a forward or rearward direction of the bottom cover 3. Further, a self-chucking mechanism 19 for use in self-chucking the optical disk 1 is fixed to. the central part of the upper section of the disk table 12.

Then, both front and rear ends 3a, 3b and both right and left sides 3c of the bottom cover 3 are raised up in a vertical direction, a lower surface 3d of the bottom cover 3 is formed with an indentation 21 faced upward within a range of substantial ½ from the front end 3a to a depth size in a horizontal state over an entire width of the bottom cover 3. Then, the bottom slider 4 is arranged within the indentation 21 of the bottom cover 3 from below in a parallel arrangement, and the bottom slider 4 is slidably attached in a parallel direction in such a way that it may be moved by a pair of right and left slide mechanisms 22 against the bottom cover 3 in arrow directions A, B of the forward or rearward direction.

In this case, a front end 4a and both right and left sides 4b of the bottom slider 4 are raised up in a vertical direction of the bottom slider 4, and the both right and left sides 4b are extended rearwardly of the bottom slider 4 and arranged in parallel at both right and left side positions of both right and left sides 3c of the bottom cover 3. Then, a pair of right and left slide mechanisms 22 comprise a pair of right and left guide members 23 attached in parallel to both right and left sides 4b of the bottom slider 4; a pair of forward and rearward horizontal guide grooves 24 formed at each of these guide members 23; and a pair of forward and rearward guide pins 25 spaced apart and attained in horizontal orientation at positions displaced toward the front ends 3a of both right and left side surfaces 3d of the bottom cover 3 and slidably engaged in a pair of front and rear guide grooves 24 of the guide member 23 in the directions A, B. The pair of right and left guide members 23 are molded by synthetic resin and the like, and attached to both right and left sides 4b with a plurality of screws in such a way that a pair of horizontal front and rear prism-like protrusions 26 integrally molded inside the guide members may be fitted from outside into a pair of front and rear horizontal elongated holes 27 formed at both right and left sides 4b of the bottom slider 4. Then, the pair of front and rear guide grooves 24 are formed in a horizontal manner inside the pair of front and rear prism-like protrusions 26 of these guide members 23.

Then, both right and left sides 5c of the top cover 5 are raised vertically in a downward direction, and the rear ends of both right and left sides 5c of the top cover 5 are rotatably attached to the rear ends of both right and left sides 3c of the bottom cover 3 with a pair of first right and left horizontal fulcrum pins 31 on the same central point in the arrow directions C, D of upward or downward direction, i.e. they may be opened or closed. However, the pair of right and left first fulcrum pins 31 are actually attached to rear ends of both right and left sides of the unit cover 16 in such a way that they may be rotated. Then, the upper surface 5d of the top cover 5 is formed with an indentation 32 concaved in a downward direction over an entire width of the top cover 5 in a range from the front end 5a to a substantial ½ of the depth size in a horizontal manner. Then, a front end 6a and both right and left sides 6b of the top slider 6 arranged in the indentation 32 of the top cover 5 from above in a horizontal state are raised in a vertical manner in downward direction, both right and left sides 6b are extended toward a rear side of the top slider 6 and arranged in parallel with both right and left side positions of both right and left sides 5c of the top cover 5. Then, the rear ends of both right and left sides 6b of the top slider 6 are rotatably attached to the rear ends of both right and left sides 4c of the bottom slider 4, i.e. in an openable or closable manner in arrow directions E, F of upward or downward direction by a pair of right and left horizontal fulcrum pins 34.

Then, the top slider 6 is connected to the top cover 5 by a pair of right and left cooperating mechanisms 35 in such a way that it may be rotatable in an upward or downward direction and slid in a forward or rearward direction. Then, the pair of right and left cooperating mechanisms 35 comprise a pair of right and left guide grooves 36 formed in parallel with each other at front ends of both right and left sides 5c of the top cover 5, and a pair of right and left guide pins 37 attached to an inside part of substantial intermediate section in a forward or rearward direction of both right and left sides 6b of the top slider 6 and engaged within the pair of right and left guide grooves 36 in a rotatable and slidable manner. In this case, the pair of guide pins 37 are arranged on the same center in a horizontal manner. Then, one end of one twisting coil spring 38 acting as a lid opening biasing means fixed to one side of the rear end 3b of the bottom cover 3 is projected upwardly from a slit 39 formed in the unit cover 16, and the top cover 5 is biased to open the lid in an arrow D direction of a lid opening direction by this twisting coil spring 38.

Then, a pair of right and left tension coil springs 41 acting as the slide biasing means are arranged in a parallel manner between both right and left sides 3c, 4b of the bottom cover 3 and the bottom slider 4. Each of both front and rear ends of these pair of right and left tension coil springs 41 is engaged with front end positions of both right and left sides 3c of the bottom cover 3 and rear end positions of both right and left sides 4c of the bottom slider 4, respectively. Accordingly, the bottom cover 3 is slidably biased by these pair of right and left tension coil springs 41 in respect to the bottom slider 4 in the arrow B direction of an extending direction.

Figure 2:
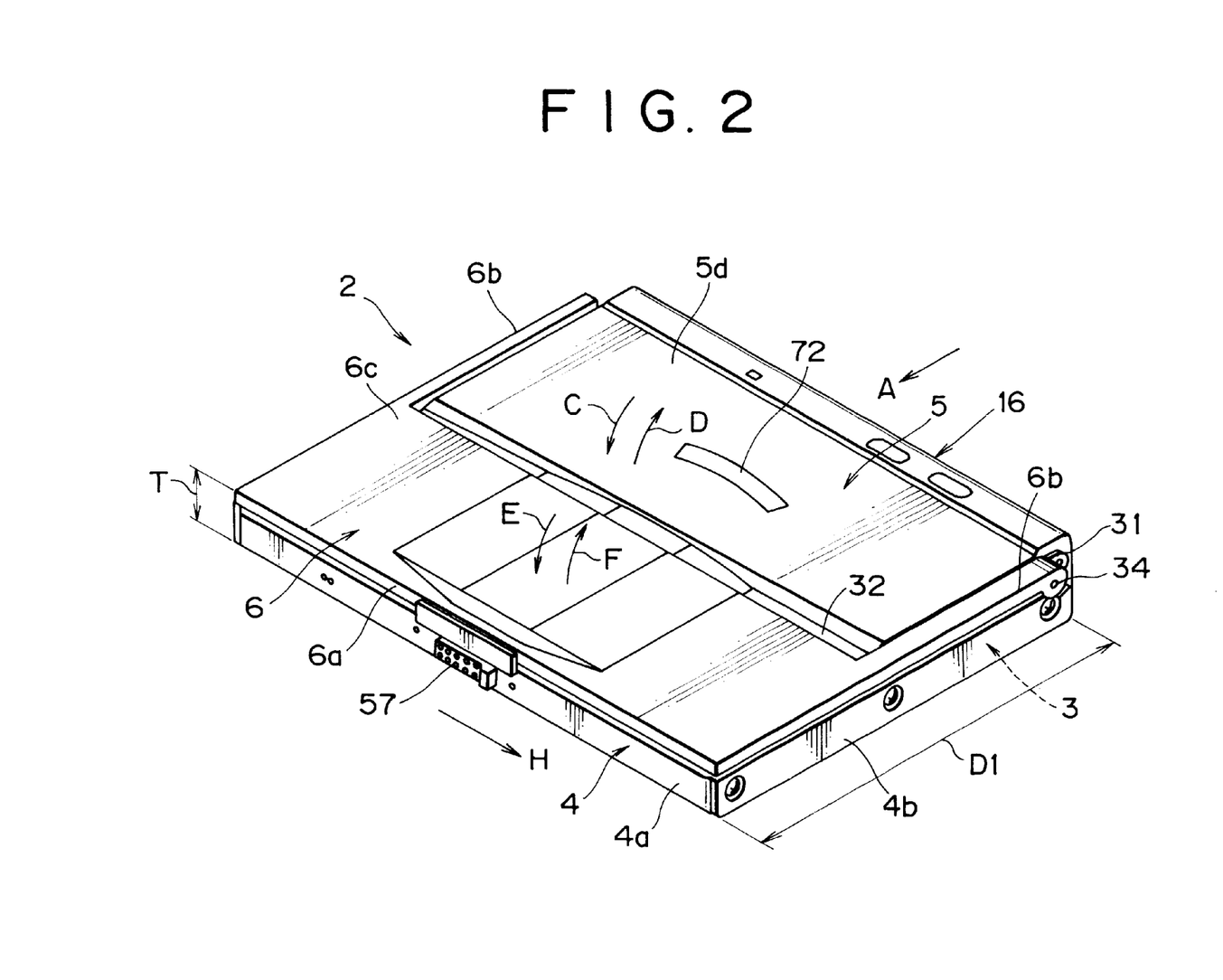
FIG. 2 is a perspective view for showing a state in which the case is reduced in its size.
Figure 3:
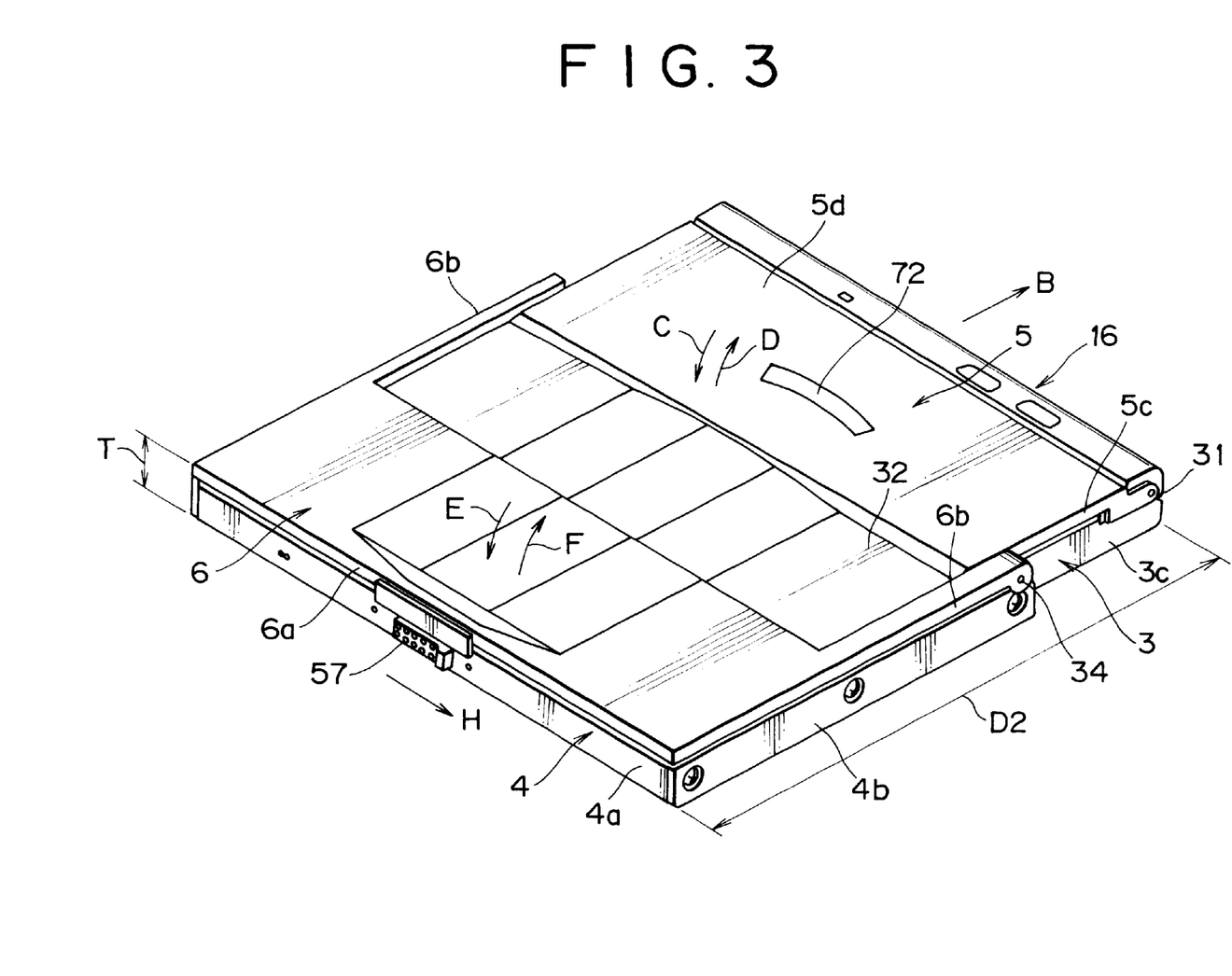
FIG. 3 is a perspective view for showing a state in which the case is extended.
Figure 5:
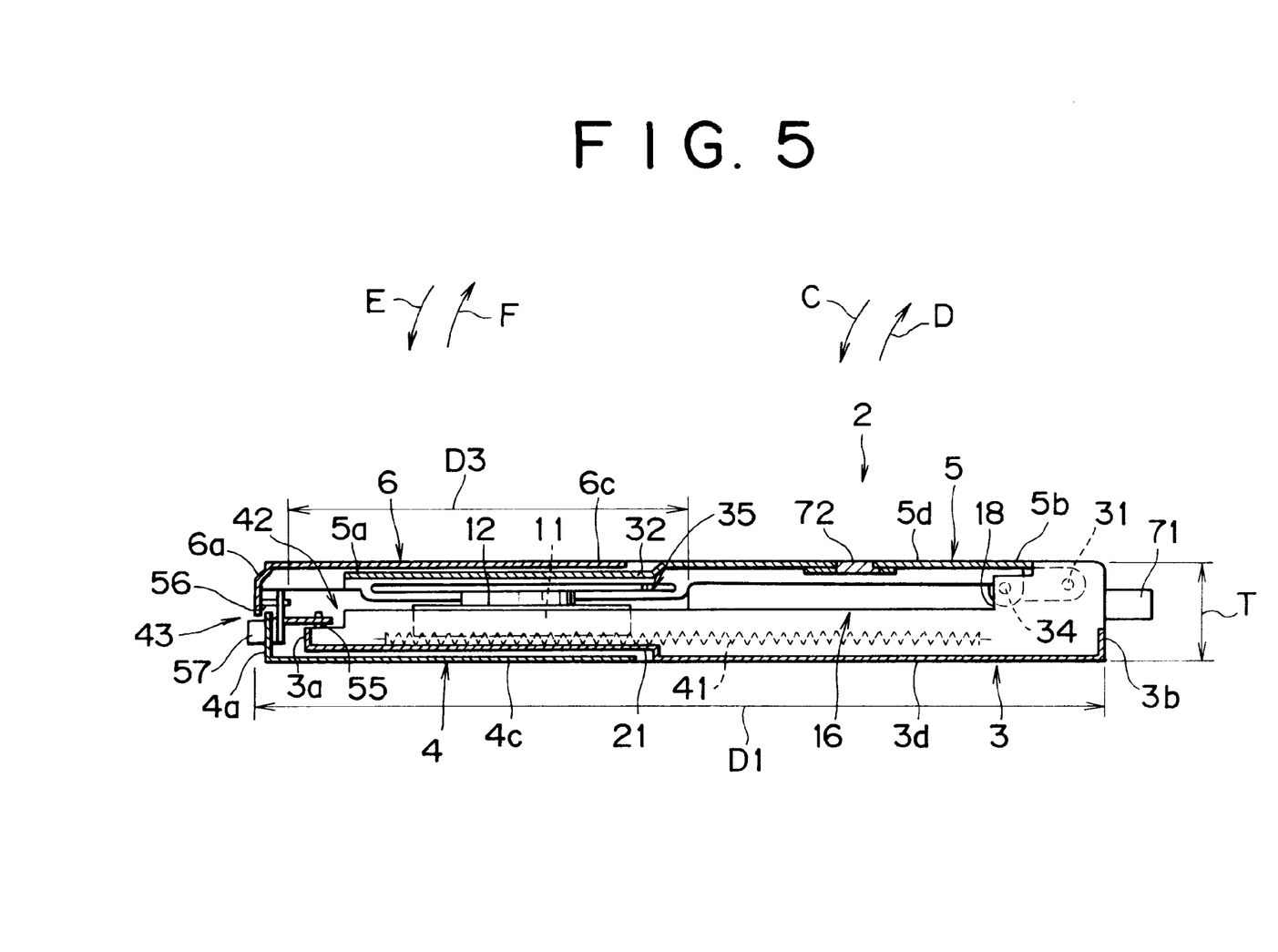
FIG. 5 is a side elevational view with a part of the reduced state of the case shown in FIG. 2 being broken away.
Figure 6:
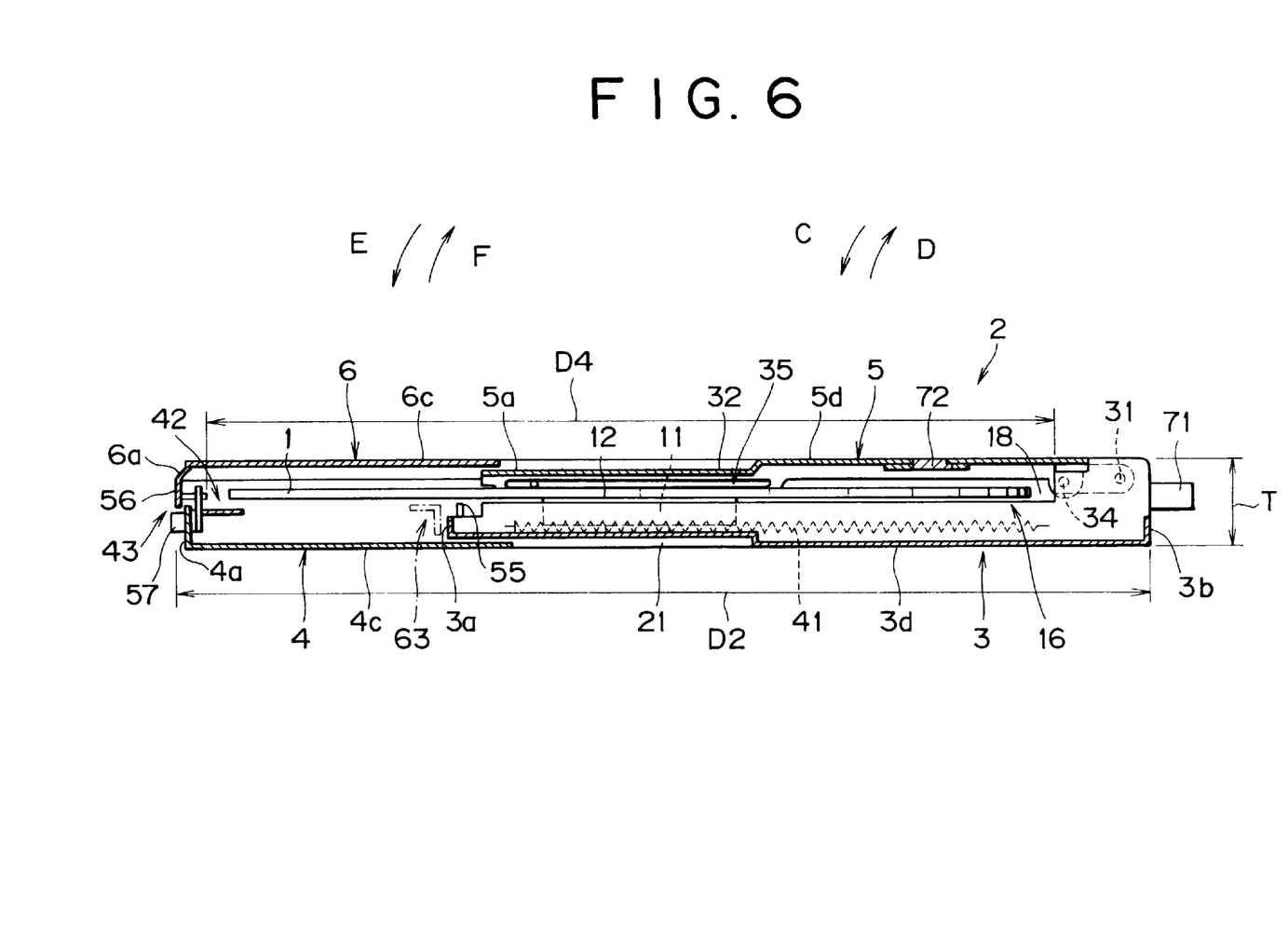
FIG. 6 is a side elevational view with a part of the extended state of the case shown in FIG. 3 being broken away.

With such an arrangement as above, the case 2 is constructed to be extendable and retractable in the directions of arrows A and B in a forward or rearward direction between one state as shown in FIGS. 2 and 5 in which its depth size D1 is reduced in the direction of the arrow A against a pair of tension coil springs 41 and the other state as shown in FIGS. 3 and 6 in which a depth size D2 is extended in the direction of the arrow B by a pair of right and left tension springs 41. Then, the case 2 is extended as shown in FIGS. 3 and 6, a disk storing space 42 having a larger depth size D4 than a diameter of the optical disk 1 and capable of easily storing the optical disk 1 in a horizontal state is formed within the indentation 18 at the upper part of the unit cover 16 of the bottom cover 3 between it and the front end 6a of the top slider 6. Then, the case 2 is reduced as shown in FIGS. 2 and 5 to cause a depth size D3 of the disk storing space 42 to be substantially reduced more than a diameter of the optical disk 1.

Then, this disc drive comprises a reduced state lock mechanism 43 for locking the case 2 in its reduced state and an extended state lock mechanism 63 for locking the case 2 in its extended state.

Figure 8:
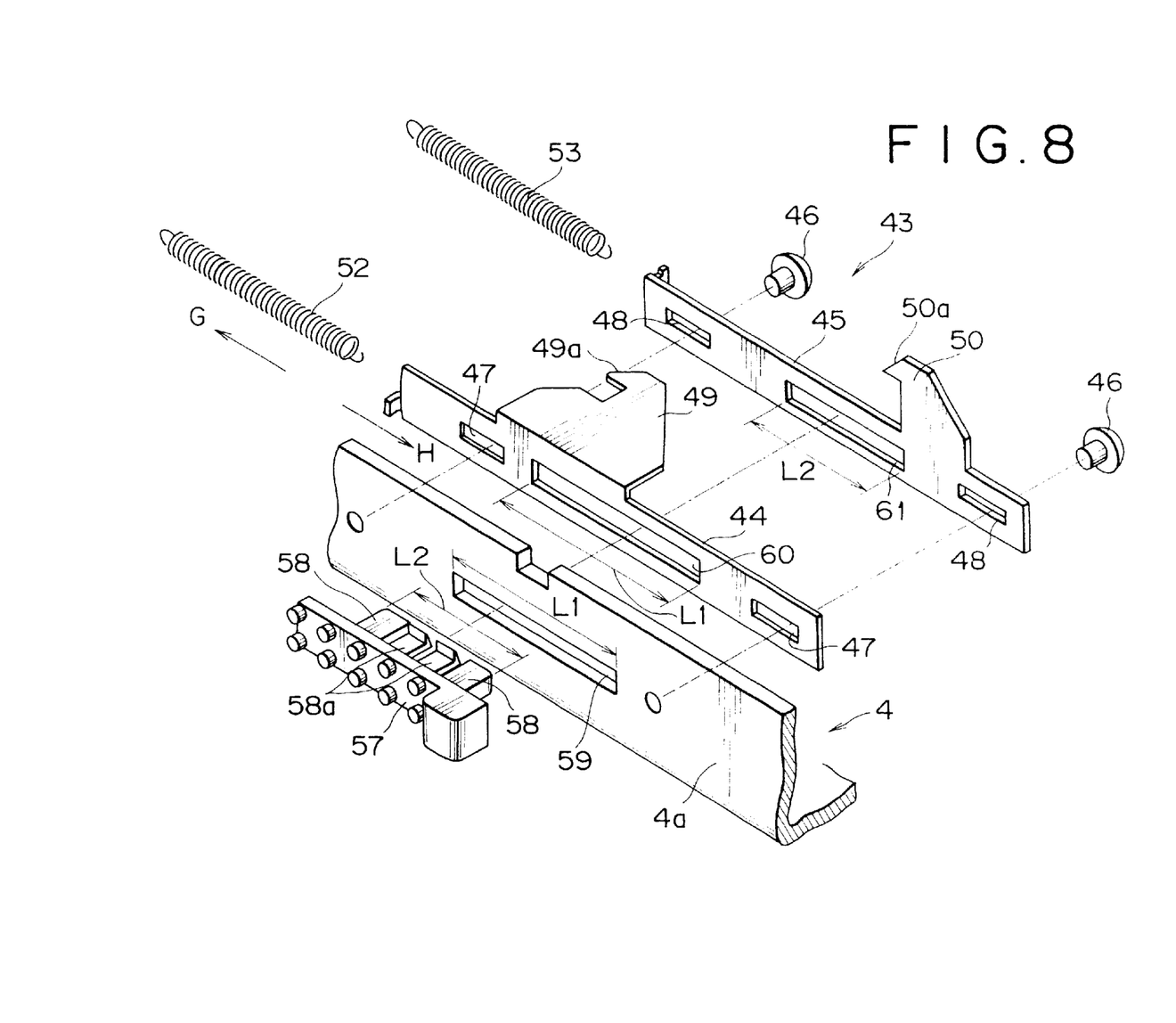
FIG. 8 is an exploded perspective view for illustrating a lock mechanism for a reduced state of the case.
Figure 9:
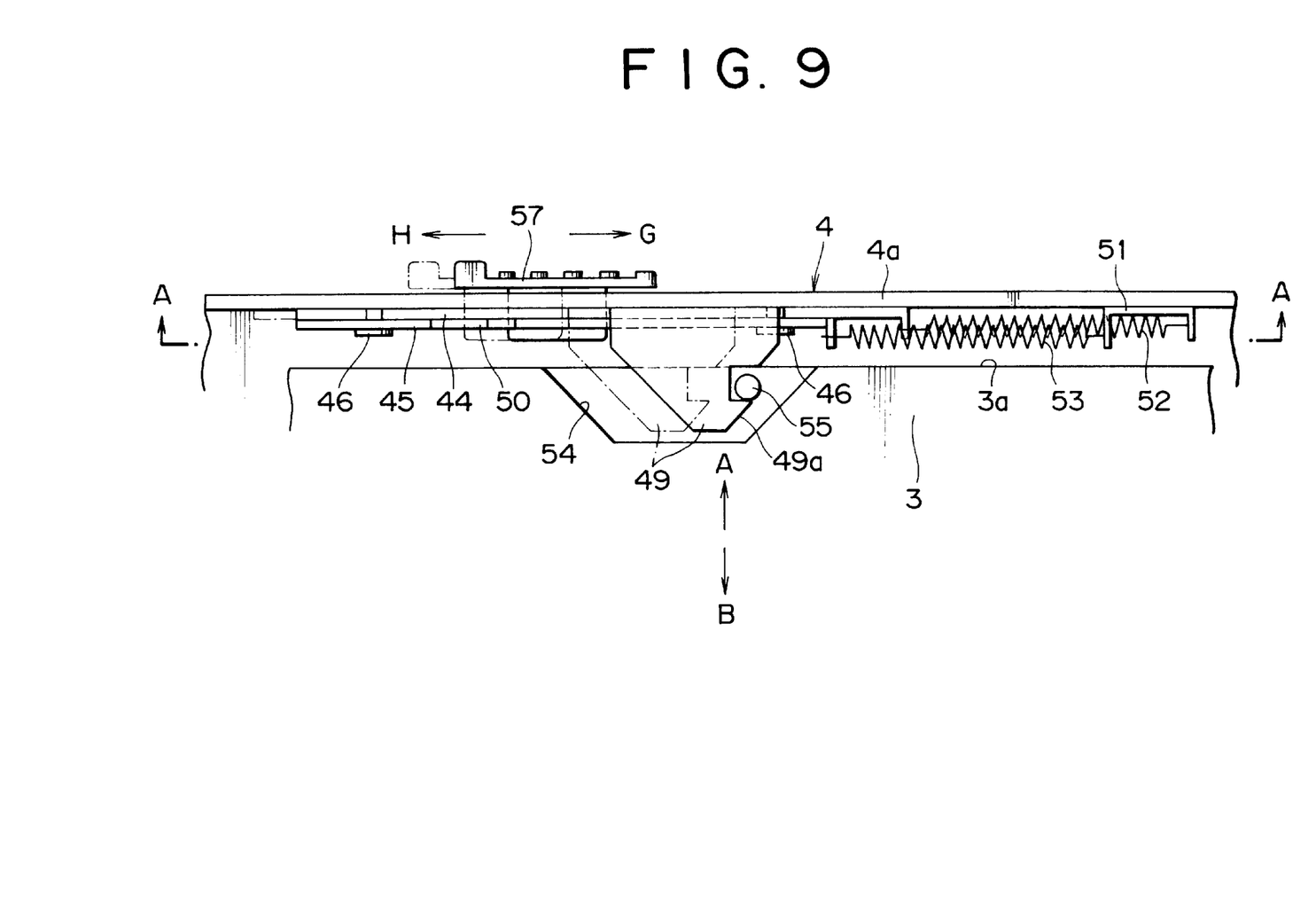
FIG. 9 is a top plan view for illustrating a lock mechanism for a reduced state of the case.

Then, as shown in FIGS. 8 and 9, the reduced state lock mechanism 43 comprises a first lock slider 44 acting as a first lock means arranged at an inner side of a substantial central part of the front end 4a of the bottom slider 4 to lock the bottom cover 3 and the bottom slider 4 in their reduced state, and a second lock slider 45 acting as a second lock means to lock the top cover 5 and the top slider 6 in a lid closed state.

Then, these first and second lock sliders 44, 45 are overlapped in parallel from each other inside the front end 4a of the bottom slider 4 and are slidably attached to a pair of right and left guide pins 46 spaced apart in a lateral direction inside the front end 4a and fixed there by each of a pair of right and left horizontal guide grooves 47, 48 in the arrow directions G, H, respectively. Then, a first lock claw 49 and a second lock claw 50 are integrally formed at the upper sections of displaced positions of these first and second lock sliders 44, 45 in the directions of arrows G, H from each other. Then, the first lock claw 49 is bent toward a rearward direction in a horizontal manner across the upper part of the second lock slider 44, and the second lock claw 50 is protruded upward in a vertical direction. Then, a pair of upper and lower first and second tension coil springs 52, 53 acting as slide biasing means are bridged in parallel with these members between the ends of these first and second lock sliders 44, 45 in the direction of arrow G and a spring hook 51 acting as a spring engagement section cooperatively used for two springs fixed at a position inside the front end 4a of the bottom slider 4 and displaced in the direction of arrow G by these first and second lock sliders 44, 45. The first and second lock sliders 44, 45 are slid and biased in the direction of arrow G of one side by these first and second tension coil springs 52, 53. Then, a small indentation 54 is formed at a part of the front end 3a of the bottom cover 3 and a bottom corresponding part of the indentation 18 of the unit cover 16. A first lock pin 55 acting as a first lock means locked by a first lock claw 49 is fixed in a vertical state at a position slightly displaced in a direction of arrow G within the indentation 54. In addition, a second lock pin 56 acting as a second lock means to be locked with the second lock claw 50 is fixed inside a substantial central part of the front end 6a of the top slider in a horizontal state in parallel with the directions of arrows A and B in a forward or a rearward direction. Further, the extreme ends of the first lock claw 49 and the second lock claw 50 are formed with slant surfaces 49a, 50a for guiding the first lock pin 55 and the second lock pin 56 and locking them.

Then, at an outside position of a substantial central part of the front end 4a of the bottom slider 4 is attached to be slidable in the directions of arrows G, H a slide knob 57 for concurrently releasing locked state against the first lock pin 55 and the second lock pin 56 with these first and second lock sliders 44, 45 under a concurrent sliding operation of the first lock slider 44 and the second lock slider 45 in the direction of arrow H. In this case, slide guides 58 integrally molded at a back surface of the slide knob 57 are inserted in common into longitudinal holes 60, 61 formed in a horizontal state at substantial central sections of the first lock slider 44 and the second lock slider 45 through a guide groove 59 formed in a horizontal state at a substantial central part of the front end 4a and engaged therein. The slide knob 57 is slidably attached within the length of the guide groove 59 along the front end 4a in the directions of arrows G, H. In addition, the slide guides 58 of the slide knob 57 pass through the longitudinal hole 60 of a first lock slider 44 and are fitted to the longitudinal hole 61 of a second lock slider 45 and engaged with the second lock slider 45 by engagement claws 58a integrally molded at the extreme ends of the central part of the slide guides 58. Accordingly, this slide knob 57 is constituted in such a way that it may be integrally slid with the second lock slider 45 in the directions of arrows G, H. However, a length L1 of the longitudinal hole 60 of the first lock slider 44 in the directions of arrows G, H is set to be longer than a length L2 of the slide guides 58, and the first lock slider 44 can be slid independently toward the direction of arrow H against the slide knob 57. In addition, a length of the guide groove 59 is also set to a substantial same size as L1.

Figure 11:
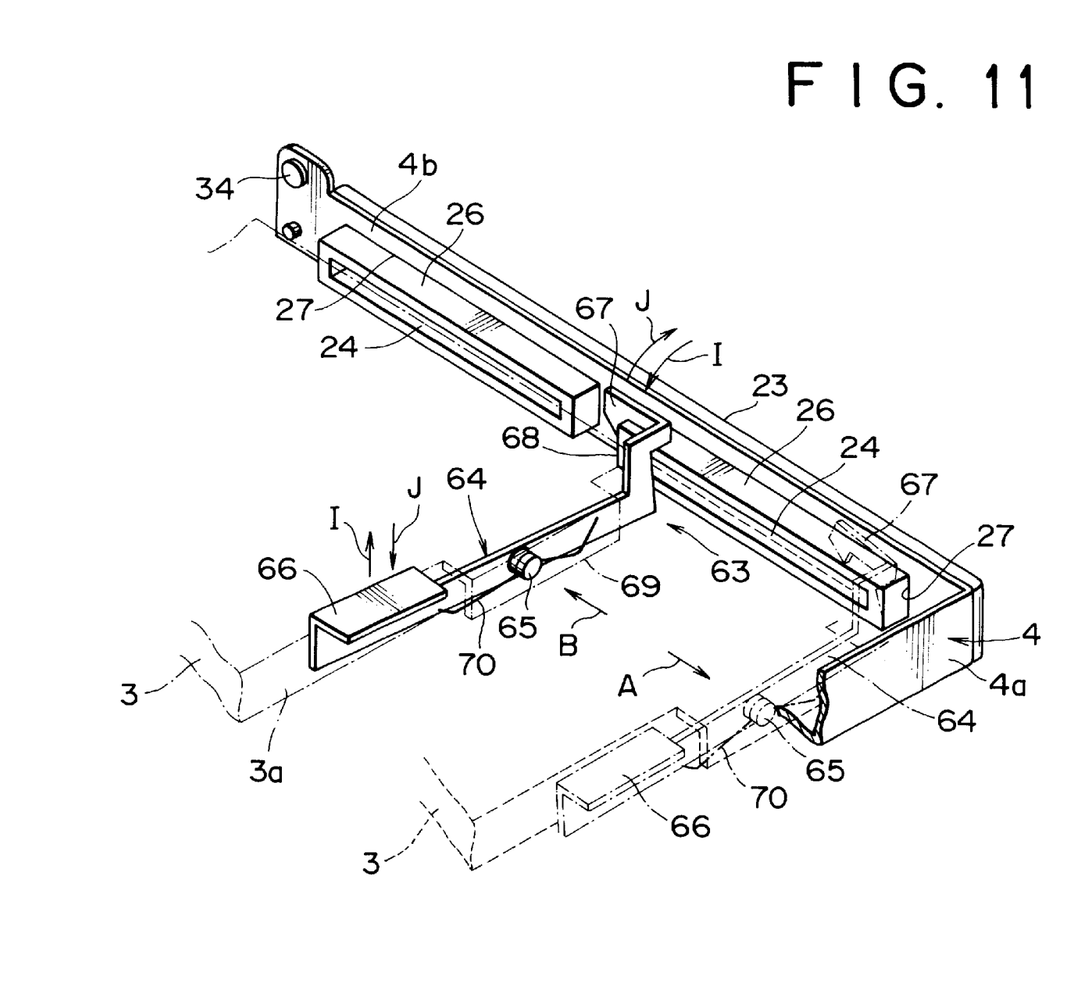
FIG. 11 is a perspective view illustrating a lock mechanism for an extended state of the case.

Next, an extended state lock mechanism 63 has a lock arm 64 fixed at a position displaced at one side of the front end 3a of the bottom cover 3. Then, a substantial central part in the longitudinal direction of the lock arm 64 is rotatably attached to the front end 3a by a horizontal fulcrum pin 65 in parallel with the directions of arrows A, B in a forward or rearward direction in a see-saw manner in the directions of arrows I, J of a vertical direction. A push knob 66 is integrally formed at the upper part of an inner end of the lock arm 64 and a lock claw 67 bent at a right angle toward the direction of arrow B of a rearward direction and formed in a downward direction is integrally formed at an outer end. Then, an indentation (a step) formed between a pair of forward and rearward prism-like protrusions 26 of one guide member 23 fixed in parallel with one side 4b of the bottom slider 4 is formed at a lock section 68 with which the lock claw 67 is engaged. Then, a front surface side of the fulcrum pin 65 of the lock arm 64 is covered by a cover section 69 integrally molded in a substantial L-shape in a downward direction at one side of the front end of the unit cover 16, both ends of the twisted coil spring 70 acting as a rotation biasing means fixed to the outer circumference of the fulcrum pin 65 are engaged with the push knob 66 of the lock arm 64 and the cover section 69, the lock arm 64 is rotationally biased by the twisting coil spring 70 in the direction of arrow I in which the push knob 66 is lifted up. Further, to the rear surface of the rear end 3b of the bottom cover 3 is fixed an external interface 71. A power source switch and a reproduction switch or a stop switch or an ear-phone jack or a volume or the like (not shown) are fixed to a rear surface of the rear end 3b of the bottom cover 3 or the positions of rear ends of both right and left sides 3c. The ear-phone jack or a volume or the like fixed to the rear end positions of both right and left sides 3c can be operated when they are drawn out to a rear side of the bottom slider 4 under a state in which the case 2 is extended as shown in FIG. 3. In addition, at a substantial central part of the rear end 5b at the upper surface 5c of the top cover 5 is arranged an optical disk sight window 72.

Figure 10:
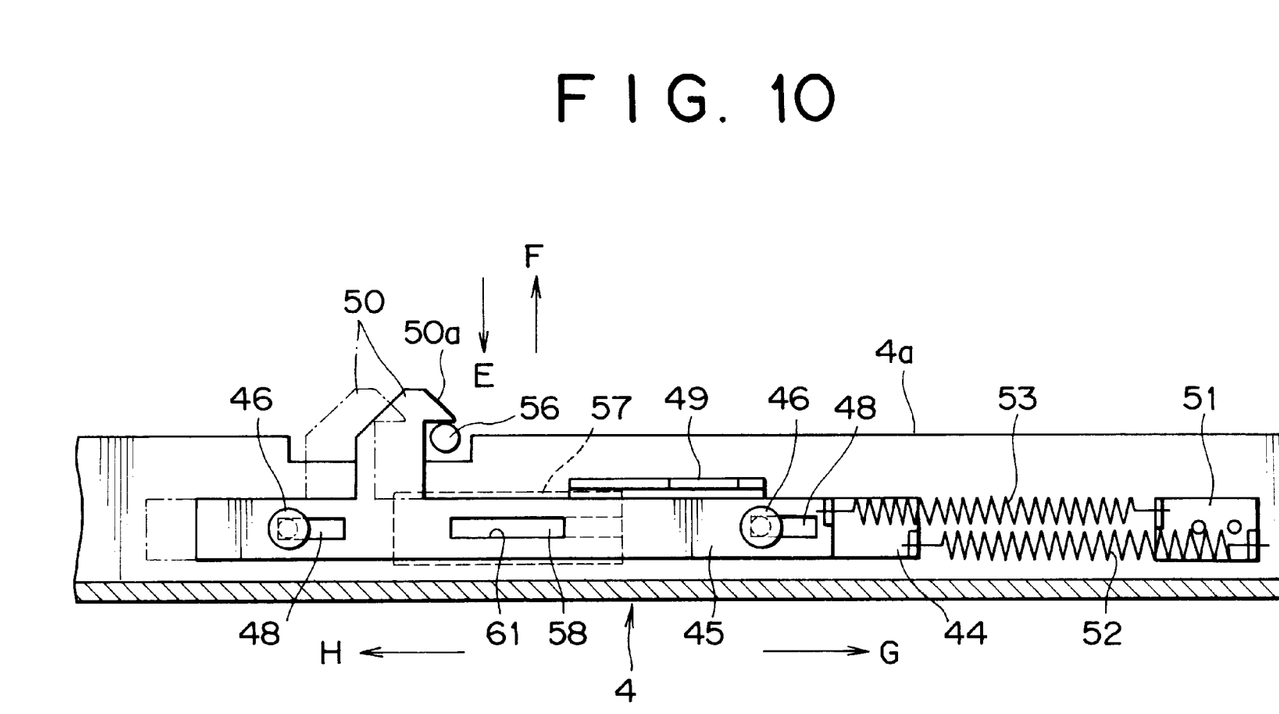
FIG. 10 is a side elevational view taken along an arrow line A—A of FIG. 9.

The case 2 of the disc drive is constructed as described above. FIGS. 2 and 5 illustrate a state in which the case 2 is folded into a reduced condition and closed. At this time, as shown in FIGS. 9 and 10, the first lock pin 55 and the second lock pin 56 are locked together by the first and second lock claws 49, 50 of the reduced state lock mechanism 43. In addition, the lock arm 64 of the extended state lock mechanism 63 shown in FIG. 11 is in a lock-released condition as indicated by a dotted line.

Then, under a state in which the case 2 is folded and closed, the depth size D1 of an entire case 2 is remarkably reduced, and it is constituted into a small-sized flat case 2 having a thin thickness T in which it shows an outer appearance quite convenient in its portable state. In addition, under the state in which the case 2 is folded and closed, the bottom slider 4 and the top slider 6 are stored in a horizontal state within each of the indentations 21, 32 of the upper surface 3d and the lower surface 5d of the bottom cover 3 and the top cover 5, wherein the lower surfaces 3d, 4c of the bottom cover 3 and the bottom slider 4 are made substantially in flush to each other and the upper surfaces 5d and 6c of the top cover 5 and the top slider 6 are made substantially in flush to each other. Then, the flush structure of each of these lower surfaces 3d, 4c and 5d, 6c improves more an entire flatness of the case 2 and this is quite convenient in the case that the case 2 is put into a pocket of suite and the like.

Next, in order to extend the case 2, the slide knob 57 in the reduced state lock mechanism 43 shown in FIG. 2 is manually slid in the direction of the arrow H. Then, the slide knob 57 is slid from the locked position indicated by a solid line to a lock released position indicated by a dotted line in FIG. 9 in the direction of the arrow H. The first lock claw 49 and the second lock claw 50 in the first lock slider 44 and the second lock slider 45 are slid concurrently by the slide guides 58 from the locked positions to the lock released position indicated by a dotted line in FIGS. 9 and 10 against the first tension coil spring 52 and the second tension coil spring 53. Then, the first lock claw 49 and the second lock claw 50 are moved away from the first lock pin 55 and the second lock pin 56 in the direction of the arrow H, and then the locked states of the bottom cover 3 and the top slider 6 against the bottom slider 4 are concurrently released.

Then, the bottom cover 3 and the top cover 5 are pulled out automatically in the rearward direction of the arrow B against the bottom slider 4 as shown in FIGS. 3 and 6 with a tension force charged in a pair of right and left tension coil springs 41 at first in the moment of releasing locked state. At this time, the bottom cover 3 is guided by a pair of right and left slide mechanisms 22 shown in FIG. 7 against the bottom slider 4 and smoothly slid in the direction of the arrow B. Then, these slide mechanisms 22 are operated such that each of a pair of right and left guide pins 25 integral with the bottom cover 3 is slid within each of a pair of right and left guide grooves 24 of the bottom slider 4 from the position indicated by a solid line to a position indicated by a dotted line in FIG. 7, these guide pins 25 are abutted against the rear ends (end part at the direction of the arrow B) and stopped, thereby the sliding position of the bottom cover 3 in the direction of the arrow B is restricted against the bottom slider 4.

In addition, the lock arm 64 of the extended state lock mechanism 63 is slid in the direction of arrow B from the locked state releasing position indicated by a dotted line to the lock position indicated by a solid line as shown in FIG. 11 under a sliding action of the bottom cover 3 in the direction of the arrow B against the bottom slider 4. At this time, the lock claw 67 of the lock arm 64 is slid in the direction of the arrow B along the upper part of the prism-like protrusion 26 arranged at the front end 4a of the bottom slider 4 and at the moment in which it reaches the lock position indicated by the solid line, the lock arm 64 is rotated by the twisting coil spring 70 in the direction of the arrow J, and the lock claw 67 drops down and is automatically engaged with the lock section 68.

Figure 7:
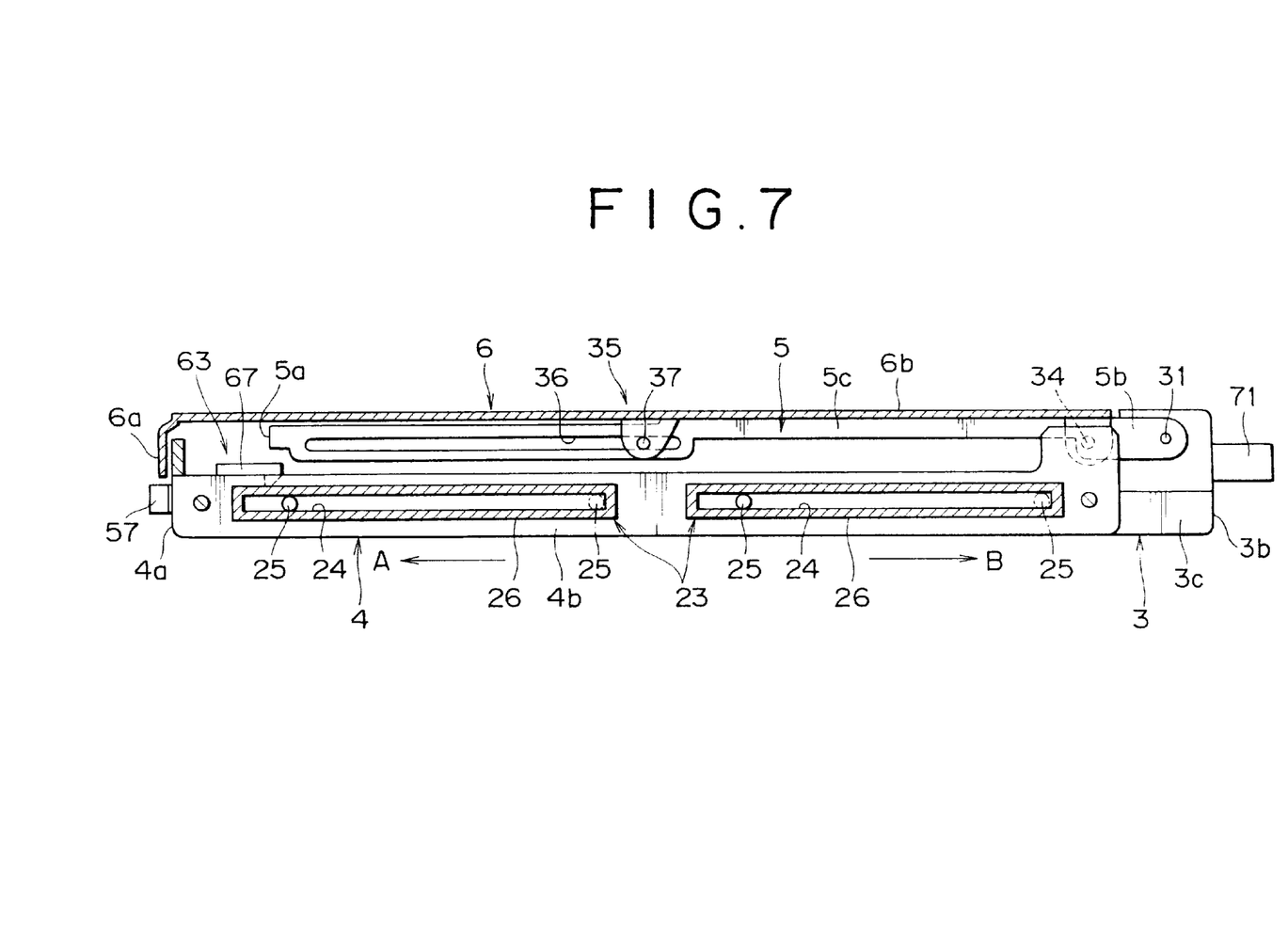
FIG. 7 is a side elevational view with a part being broken away to illustrate a bottom cover sliding mechanism in respect to a bottom slider and a cooperating mechanism for a top slider and a top cover.

Then, the bottom cover 3 is locked against the bottom slider 4 by this lock arm 64, resulting in that the bottom cover 3 can not be slid in the direction of arrow A which is a forward orientation against the bottom slider 4. That is, as shown in FIG. 7, each of a pair of right and left guide pins 25 is abutted against the rear end (the end part at the direction of the arrow B) of each of a pair of right and left guide grooves 24, thereby a sliding action of the bottom cover 3 in the direction of the arrow B in respect to the bottom slider 4 is restricted, the lock claw 67 of the lock arm 64 is engaged with the lock part 68 of the bottom slider 4 to cause the sliding action of the bottom cover 3 in the direction of the arrow A in respect to the bottom slider 4 to be restricted and the bottom cover 3 is locked in its non-moved state against both directions of arrows A, B in a forward or rearward direction against the bottom slider 4.

Figure 4:
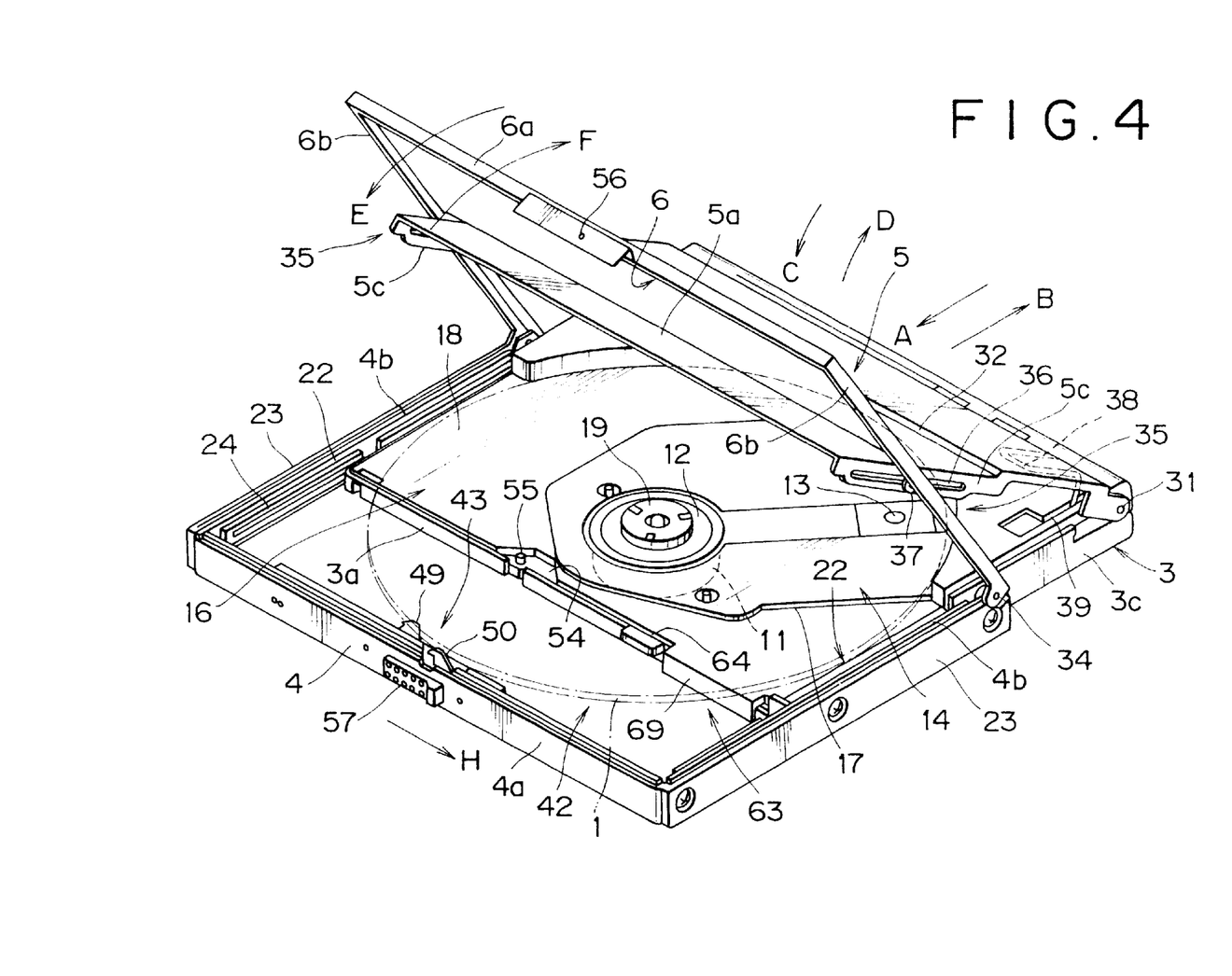
FIG. 4 is a perspective view for showing a state in which the case is extended and the upper part of the case is released.

Then, as shown in FIG. 4, when the bottom cover 3 is pulled out in the direction of the arrow B in respect to the bottom slider 4 under a state in which the locked condition of the top slider 6 against the bottom slider 4 is released, the top cover 5 rotatably attached to the upper part of the bottom cover 3 by a pair of first right and left fulcrum pins 31 is automatically opened in the direction of the arrow D around a pair of first right and left fulcrum pins 34 by the twisting coil spring 38 against the bottom cover 3. A pair of right and left guide pins 37 at the side of the top slider 6 are driven in the direction of the arrow D by a pair of right and left guide grooves 36 at the top cover 5 of a pair of right and left cooperating mechanisms 35, and the top slider 6 is automatically opened in the direction of the arrow F around a pair of second right and left fulcrum pins 34 attached to the bottom slider 4. That is, the top cover 5 and the top slider 6 are cooperatively moved by the cooperating mechanisms 35 and automatically opened in the directions of arrows D, F by one twisting coil spring 38.

Accordingly, under a one-finger touch operation in which the slide knob 57 is slidably operated in the direction of the arrow H and the first and second lock pins 55, 56 are concurrently released for their locked states, the bottom cover 3 can be pulled out automatically in the direction of the arrow B which is a rear part of the bottom slider 4 and the case 2 can be extended automatically from the reduced state shown in FIGS. 2 and 5 to an extended state shown in FIGS. 3 and 6 and concurrently as shown in FIG. 4, the bottom cover 5 and the top slider 6 can be automatically opened in the directions of arrows D, F toward the upper sides of the bottom cover 3 and the bottom slider 4.

Then, the case 2 is extended into the extended state and its depth size D2 is expanded as shown in FIGS. 4 and 6, thereby a depth size D4 of the disk storing space 42 formed between the indentation 18 at the upper part of the bottom cover 3 and the front end 4a of the bottom slider 4 is expanded to a larger size than a diameter of the optical disk 1 in such a way that the optical disk 12 can be stored.

Then, as shown by the dotted line in FIG. 4 and by the solid line in FIG. 6, the optical disk 1 is inserted into the disk storing space 42 from below the top slider 6 and the top cover 5 already opened and chucked in a horizontal state to the disk table 12 of the spindle motor 11 by the self-chucking mechanism 19, and the optical disk 1 is installed at a state in which it is approached to the upper part of the optical pick-up 13.

At this time, the upper part of the extended state lock mechanism 63 is hidden by the optical disk 1 installed in a horizontal state on the upper part of the spindle motor 11 and the locked state releasing operation for the extended state lock mechanism 63 can not be carried out under the loaded state of the optical disk 1.

Accordingly, under the state in which the optical disk 1 is loaded on the spindle motor 11, the disk 2 can not be folded into a small size as described latter and the case 2 is folded while the optical disk 1 is being loaded on the spindle motor 11, resulting in that it is possible to avoid some disadvantages that the optical disk 1 is damaged or a user injury of user's hand or fingers and then a high safety state can be assured.

In view of the foregoing, as the front end 6a of the top slider 6 opened as shown in FIG. 4 is pushed down with hand or fingers in the direction of the arrow E to close a lid after loading the optical disk 1, the top cover 5 is cooperated with the top slider 6 by a pair of right and left cooperating mechanisms 33 and pushed down in the direction of the arrow C against the twisting coil spring 38. Then, as shown in FIGS. 3 and 6, at the moment when the top slider 6 and the top cover 5 reach the closed position where the upper sections of the bottom cover 3 and the bottom slider 4 are closed in a horizontal state, the second lock pin 56 fixed inside the front end 6a of the top slider 6 is automatically locked to the second lock claw 54 of the second lock slider 45 of the reduced state lock mechanism 43, resulting in that the top cover 5 is also. integrally locked with the top slider 6.

At this time, the second lock pin 56 is pushed against a slant surface 50a for guiding the second lock claw 5 from the direction of the arrow E, the second lock slider 45 is automatically returned back in the direction of the arrow G by the second tension coil spring 53 after it is once released in the direction of the arrow H against the second tension coil spring 53, thereby the. second lock pin 56 is automatically locked to the second lock claw 50.

With the foregoing arrangement, the case 2 is closed under a state in which the optical disk 1 is loaded in a horizontal state within the disk storing space 42. Thus, if the reproducing switch is turned ON, it is possible that the optical disk 1 is rotationally driven at a high speed by the spindle motor 11 together with the disk table 12 and data in the optical disk 1 are reproduced by the optical pick-up 13. At this time, since the optical disk 1 is stored in the closed case 2, it is possible to assure a high dust-proof characteristic against the optical disk 1, some foreign materials or hand or fingers are contacted in accident with the optical disk 1 rotated at a high speed from the external part of the case 2, a dangerous state such as a damage of the optical disk 1 due to their contact or injury of hand or fingers and the like can be avoided, resulting in that a high safety characteristic can be assured. In addition, even under the closed state of the case 2, the bottom slider 4 and the top slider 6 are installed in the indentations 21, 32 of the bottom cover 3 and the top cover 5, wherein each of the upper and lower surfaces 4c, 3d, 6c and 5d holds a flushed state, respectively, and a flat state of the case 1 is assured.

Next, upon completion of reproduction of the optical disk 1, the slide knob 57 is slid again in the direction of the arrow H and the locked state of the second lock pin 56 is released again, and the top cover 5 and the top slider 6 are adjusted again in the directions of the arrows D, F as shown in FIG. 4. Then, after the optical disk 1 is removed from the self-chucking mechanism 19 of the spindle motor 11 and taken out of the case 2, the case 2 is folded again into a reduced state shown in FIGS. 2 and 5.

At this time, as shown in FIG. 4, the optical disk 1 is taken out of the case 2 to cause the upper part of the push knob 66 of the lock arm 64 of the extended state lock mechanism 63 to be released. Then, the push knob 66 at one end of the lock arm 64 placed at a lock position indicated by a solid line in FIG. 11 is pushed by a hand or fingers in a downward direction of the arrow J, the lock arm 64 is rotated in the direction of the arrow J around the fulcrum pin 65 against the twisting coil spring 70. Then, the lock claw 67 at the other end of the lock arm 64 is pulled upwardly of the lock section 68 of the bottom slider 4 and the locked state of the bottom cover 3 with the lock arm 64 is released, so that after this operation, if the rear end 13b of the bottom cover 13 is pushed with a hand or fingers in the direction of the arrow A, the bottom cover 3 can be pushed into the bottom slider 4 against the pair of right and left tension coil springs 41 in the direction of the arrow A, resulting in that the case 2 can be folded from the extended state shown in FIGS. 3 and 6 to the reduced state shown in FIGS. 2 and 5.

In this case, the entire case 2 is supported by both hands, and after the push knob 66 is pushed with a left hand thumb, for example, in the direction of arrow J, the bottom cover 3 is pushed with a right hand into the bottom slider 4 from the direction of the arrow A, for example, the case 2 can be folded easily and smoothly from the extended state to the reduced state. Then, the pushing of the bottom cover 3 into the bottom slider 4 in the direction of the arrow A causes the lock claw 67 of the lock arm 64 to be slid in the direction of the arrow A on the upper surface of the prism-like protrusion 26 at the front end 4a of the bottom slider 4 from the locked position indicated by a solid line to a locked state releasing position indicated by a dotted line in FIG. 11.

Then, as shown in FIGS. 2 and 5, when the bottom cover 3 is pushed into the bottom slider 4 from the direction of the arrow A only by a predetermined depth size,. the first lock pin 55 is automatically locked against the first lock claw 49 of the first lock lever 44 at the reduced state lock mechanism 43 as indicated with a solid line in FIG. 9.

That is, at this time, the first lock pin 55 is pushed against the guiding slant surface 49a of the first lock claw 49 from the direction of the arrow A, after the first lock slider 44 is once released in the direction of the arrow H against the first tension coil spring 52, the first lock pin 55 is automatically locked to the first lock claw 49 in such a way that it is automatically returned back by the first tension coil spring 52 in the direction of the arrow G.

With such an arrangement as above, the bottom cover 3 is locked in the bottom slider 4, the pushing of the bottom cover 3 into the bottom slider 4 from the direction of the arrow A causes a pair of right and left tension coil springs 41 to be extended in the direction of the arrow A, and then a sliding biasing force (a tension force) for use in drawing out the bottom cover 3 from within the bottom slider 4 in the direction of the arrow B is charged in these tension coil springs 41. In addition, at this time, a pair of right and left first fulcrum pins 31 of the top cover 5 are slid in the direction of the arrow A against the bottom slider 6 together with the bottom cover 3, thereby the top cover 5 is inserted in a slant upward direction against the top slider 6, resulting in that a clearance between the top cover 5 and the top slider 6 is also reduced.

Thus, finally, when the front end 6a of the top slider 6 is pushed down by a hand or fingers in the direction of the arrow E in a downward direction, the top cover 5 is also rotated in the direction of the arrow C around the pair of right and left first fulcrum pins 31 against the twisting coil spring 38 in cooperation with a rotation of the top slider 6 in the direction of the arrow E around the pair of right and left second fulcrum pins 34, resulting in that these top cover 5 and top slider 6 can be folded from the lid opening position indicated in FIG. 4 to the horizontal lid closing position indicated in FIGS. 2 and 5 in the directions of the arrows C, E. In this case, the pair of right and left guide pins 37 of the pair of right and left cooperating mechanisms 35 are slid from each other within the pair of right and left guide grooves 36, thereby these top cover 5 and top slider 6 can be folded smoothly.

Then, in the case that these top cover 5 and top slider 6 are folded up to the lid closing position in the directions of arrows C, E and these top cover 5 and top slider 6 close in a horizontal state the bottom cover 3 and the upper part of the bottom slider 4, the second lock pin 56 fixed to the top slider 6 as shown in FIG. 10 is automatically locked to the second lock claw 50 of the second lock slider 45 of the reduced state lock mechanism 43.

That is, at this time, as shown in FIG. 8, since the length L1 of the longitudinal hole 60 of the first lock slider 44 is set to be longer than a length L2 of the longitudinal holes in the slide guide 58 of the slide knob 57 and the second lock slider 45, the second lock slider 45 can be slid in the direction of the arrow H in independent against the first lock slider 44 only an amount corresponding to L1−L2=X (a difference in length) even though the first lock slider 44 is slidably biased by the first tension coil spring 52 in the direction of the arrow G.

Accordingly, as indicated by a solid line in FIG. 9, the first lock slider 44 is slidably biased by the first tension coil spring 52 up to the locked position in the direction of the arrow G, as shown in FIG. 10, the second lock pin 56 is pushed from above in the direction of the arrow E against the slant surface 50a for guiding the second lock claw 50 while a locked state of the bottom cover 3 in which the first lock pin 55 fixed to the bottom cover 3 is locked is being kept by the first lock claw 49, only the second lock slider 45 is once released independently in the direction of the arrow H against the second tension coil spring 53, thereafter the second lock slider 45 is automatically returned back by the second tension coil spring 53 in the direction of the arrow G, and the second lock pin 56 is independently locked in a smooth manner by the second lock claw 50.

With such an arrangement as above, it is possible to make a substantial reduction of the depth size D1 of the case 2 as initially applied, fold it into a reduced state of flat size and lock it.

Then, as described above, in accordance with the reduced state lock mechanism 43, when the case 2 is to be extended from the reduced state to the extended state, the first lock slider 44 and the second lock slider 45 are slid concurrently in the direction of the arrow H by the slide knob 57 and the releasing of locked state of the two members of the bottom cover 3 and the top slider 6 in respect to the bottom slider 4 can be performed concurrently with one finger touch operation. Even though, when the case 2 is folded from the extended state into the reduced state, each of the first lock slider 44 and the second lock slider 45 can be independently locked, resulting in that the locking of each of the two members, i.e. the bottom cover 3 and the top slider 6 against the bottom slider 4 can be independently carried out in sequence.

Accordingly, extending and reducing operations for the case 2 can be carried out smoothly and easily and then a high operating characteristic can be realized.

Although the preferred embodiment of the present invention has been described above, various modifications can be carried out without being limited to the aforesaid preferred embodiment on the basis of the technical concept of the present invention.

For example, although an exclusive machine for reproduction of the optical disk 1 has been described in the aforesaid preferred embodiment, various kinds of disk-like recording medium can be applied to various kinds of disc drives for recording and/or reproduction. In addition, in the aforesaid preferred embodiment, although a system in which a bottom member comprising the bottom cover 3 and the bottom slider 4 and a top member comprising the top cover 5 and the top slider 6 are extended or retracted in a synchronous manner in order to constitute the extendable or retractable case 2 has been indicated, modifications such as a system in which the bottom member and the top member are independently extended or retracted from each other, a system in which only the bottom member is extended or retracted and a system in which only the top member is extended or retracted may also be applicable. In addition, in the aforesaid preferred embodiment, although a configuration in which the case 2 is extended or retracted in a depth direction (forward or rearward direction) of the directions of arrows A, B has been indicated, it is possible to employ the configuration in which the case 2 is extended or retracted in a width direction (rightward or leftward direction) of the directions of the arrows G, H.

What is claimed is:

1. A disk drive comprising:
a spindle motor on which a disk-like recording medium is installed;
means for recording and/or reproducing the disk-like recording medium; and
a case having a bottom member, and a top member for opening or closing an upper part of said bottom member,
wherein at least one of said bottom member and said top member is configured to extend from forming a non-disk-storing space that is smaller than a diameter of the disk-like recording medium to forming a disk-storing space that is large enough for storing the disk-like recording medium within said case.

2. A disk drive according to claim 1, further comprising a reduced state lock mechanism for locking said case to a reduced state.

3. A disk drive according to claim 2, further comprising an extended state lock mechanism for locking said case to an extended state.

4. A disk drive according to claim 3, wherein said extended state lock mechanism is arranged at a position where it is hidden by the disk-like recording medium stored in said disk-storing space.

5. A disk drive according to claim 2, wherein said bottom member comprises a bottom cover and a bottom slider, said top member comprises a top cover and a top slider, and wherein said reduced state lock mechanism comprises a first lock means for locking said bottom cover and said bottom slider in reduced state, and a second lock means for locking said top cover and said top slider in a lid closed state.

6. A disk drive according to claim 5, wherein said reduced state lock mechanism further comprises a first and a second slide biasing means for independently sliding and biasing said first and second lock means to a locked position and with one slide knob for concurrently releasing a locked state of said first and second lock means.

7. A disk drive comprising:
a bottom cover having a spindle motor on which a disk-like recording medium is installed;
means for recording and/or reproducing the disk-like recording medium;
a top cover attached to an upper part of said bottom cover in such a way that it may be opened or closed;

a bottom slider attached to said bottom cover in such a way that it may be extended or retracted;

a top slider attached to said top cover in such a way that it may be extended or retracted; and a case forming at least a non-disk-storing space that is smaller than a diameter of the disk-like recording medium or a disk-storing space for storing the disk-like recording medium therein, wherein said case is configured to be changed from forming said non-disk-storing space to forming said disk-storing space, by extending said bottom cover and said top cover in respect to said bottom slider and said top slider.

8. A disk drive according to claim 7, further comprising a reduced state lock mechanism for locking said case to a reduced state.

9. A disk drive according to claim 8, further comprising an extended state lock mechanism for locking said case to an extended state.

10. A disk drive according to claim 7, further comprising means for sliding and biasing at least said bottom cover in an extending direction in respect to said bottom slider.

11. A disk drive according to claim 7, wherein under at least a reduced state of said case, each of the lower surfaces of said bottom cover and said bottom slider and the upper surfaces of said top cover and said top slider is formed substantially in flush from each other.

12. A disk drive comprising:

a bottom cover having a spindle motor on which a disk-like recording medium is installed;

means for recording and/or reproducing the disk-like recording medium;

a top cover attached to an upper part of said bottom cover in such a way that it may be opened or closed;

a bottom slider attached to said bottom cover in such a way that it may be extended or retracted;

a top slider attached to an upper part of said bottom slider in such a way that it may be opened or closed and connected to said top cover through a cooperating mechanism in such a way that it may be extended or retracted; and a case forming at least a non-disk-storing space that is smaller than a diameter of the disk-like recording medium or a disk-storing space for storing the disk-like recording medium therein, wherein said case is configured to be changed from forming said non-disk-storing space to forming said disk-storing space, by extending said bottom cover in respect to said bottom slider and by extending said top cover in respect to said top slider in synchronism with the bottom cover.

13. A disk drive according to claim 12, further comprising a reduced state lock mechanism for locking said case to a reduced state.

14. A disk drive according to claim 13, further comprising an extended state lock mechanism for locking said case to an extended state.

15. A disk drive according to claim 12, further comprising means for sliding and biasing at least said bottom cover in an extending direction in respect to said bottom slider.

16. A disk drive according to claim 12, wherein under at least a reduced state of said case, each of the lower surfaces of said bottom cover and said bottom slider and the upper surfaces of said top cover and said top slider is formed substantially in flush from each other.

* * * * *